March 10, 1964  V. R. VAN DYK  3,124,202
PACKING ROLLER ATTACHMENT FOR A PLANTER
Filed July 17, 1961

Victor R. Van Dyk
INVENTOR.

BY *[signatures]*
Attorneys

# United States Patent Office 3,124,202
Patented Mar. 10, 1964

3,124,202
PACKING ROLLER ATTACHMENT
FOR A PLANTER
Victor R. Van Dyk, % Inland Foundry Co.,
320 W. Rainier Way, Spokane, Wash.
Filed July 17, 1961, Ser. No. 124,557
1 Claim. (Cl. 172—551)

The present invention relates generally to potato planters and has for its primary object to provide unique means, readily installable for operation on a standard potato planter in lieu of the usual covering discs, for covering the seedling or bud and simultaneously firming and packing the soil therearound, thus ensuring better growth characteristics and increased yield.

Another important object of this invention is to provide a packer wheel attachment for potato planters which is adapted to subject the furrow to a predetermined, uniform pressure as it rolls thereover.

A further object of the present invention is to provide an earth firming and compressing wheel of the character described which may be expeditiously attached to the rear of a conventional potato planter without materially altering or modifying same structurally.

Other objects of the invention are to provide a potato planter attachment of the character set forth which will be of simple construction, strong and durable, compact and which may be marketed at low cost.

Other advantages of the invention will become apparent from a study of the following specification, taken in connection with the accompanying drawing, wherein like characters of reference designate corresponding parts throughout the several views, and wherein.

Figure 1:
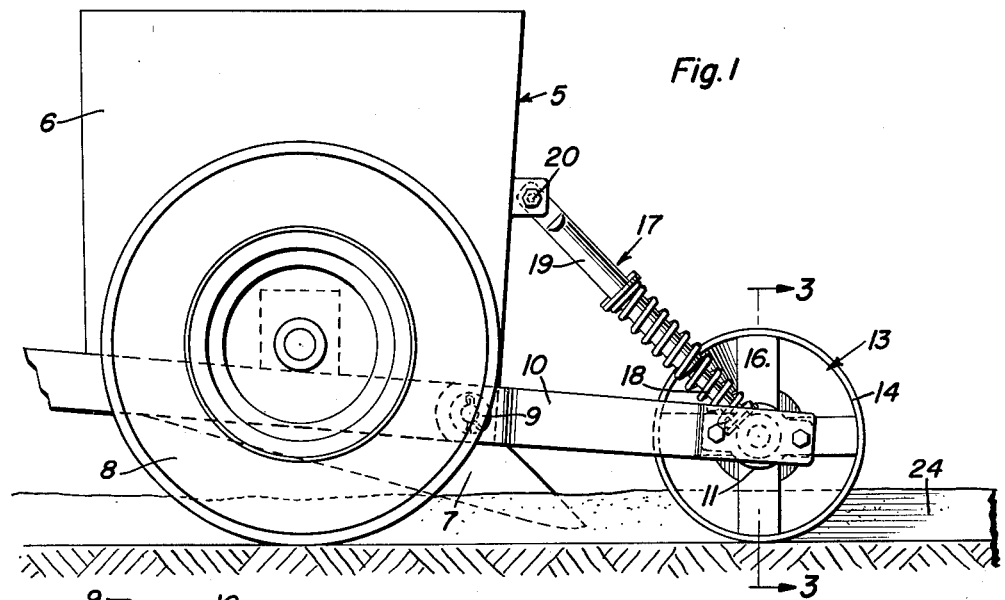
FIGURE 1 is a view in side elevation, showing an attachment embodying the present invention in use on a potato planter.
Figure 2:
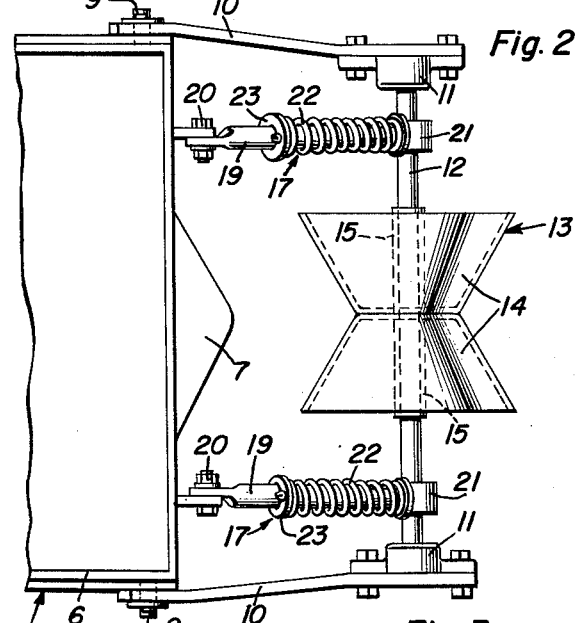
FIGURE 2 is a top plan view of the device.
Figure 4:
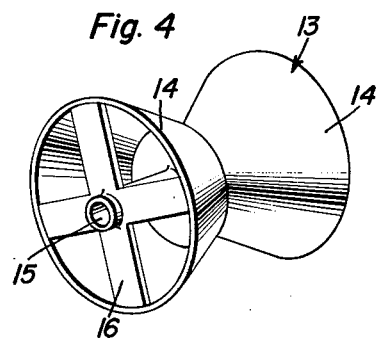
FIGURE 4 is a perspective view of the packer wheel per se.

Referring now to the drawing in detail, it will be seen that reference numeral 5 designates generally a standard potato planter. The planter 5 comprises the usual box or hopper 6 with the rearwardly and downwardly directed outlet 7, supporting wheels 8, etc.

Pivotally secured at 9 on the lower, rear portion of the box 6 and extending rearwardly therefrom is a pair of vertically swingable arms 10. Mounted on the inner sides of the free end portions of the arms 10 is a pair of self-aligning bearings 11. The end portions of a transverse shaft 12 are journaled in the bearings 11 and are capable of telescopic relation therewith.

Figure 3:
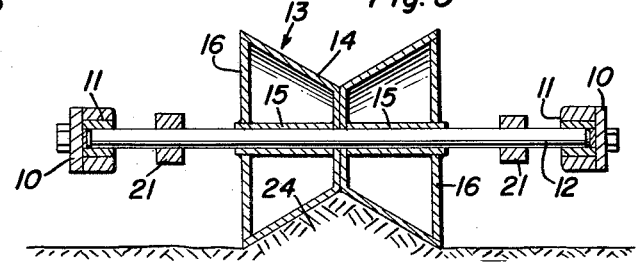
FIGURE 3 is a vertical sectional view, taken substantially on the line 3—3 of FIGURE 1.

Fixedly mounted on the intermediate portion of the shaft 12 is a generally diabolo or V-shaped packing wheel or roller which is designated generally by reference numeral 13. The roller 13 includes a pair of duplicate, opposed oppositely tapered frusto-conical half sections 14 which are fixedly secured together in end-abutting relation. As shown to advantage in FIGURE 3 of the drawing, the roller sections 14 comprise centrally located sleeves or hubs 15 through which the shaft 12 passes and which abut the inner ends of the sections 14. Spiders or spokes 16 are provided between the outer ends of the sleeves or hubs 15 and the corresponding end portions of the roller 13.

Braces 17 yieldingly urge the roller 13 downwardly. The braces 17 include telescopic male and female sections 18 and 19, respectively. At one end, the braces 17 are pivotally connected to the box 6, as indicated at 20. Bearings 21 on the other ends of the braves 17 are journaled on the shaft 12 between and spaced from the bearings 11 and the packing roller 13 for operatively connecting said braces thereto.

Compression springs 22 encircle the braces 17 for extending same and for yieldingly urging the roller 13 downwardly. The coil springs 22 are mounted under compression between the bearings 21 and collars or washers 23 on the female sections 19 of said braces.

In operation, the potato seedlings or buds are discharged in the usual manner in the furrow 24 left by the opener 7 as the implement 5 travels forwardly thereover. The immediately following or trailing V-shaped wheel or roller 13 then covers the dropped seedling or bud and simultaneously firms and compresses the soil therearound in an obvious manner. The telescopically extensible braces 17, biased by the springs 22, exert a uniform downward pressure on the wheel or roller 13.

It is believed that the many advantages of a potato planter attachment constructed in accordance with the present invention will be readily understood and although a preferred embodiment of the device is as illustrated and described, it is to be understood that changes in the details of construction may be resorted to which will fall within the scope of the invention as claimed.

What is claimed as new is as follows:

A soil packer for potato planters comprising in combination a pair of rearwardly spaced extending arms disposed in side-by-side relation, each arm having a forward end pivotally secured to a lower rear portion of a potato planter for vertical swinging movement and having a free rear and outer end, oppositely alined and inwardly opened bearings, one each of said bearings being disposed on an inner side of each of said free outer ends, a transverse rotary shaft disposed between said arms and having end portions supported by and telescopically engaged in said bearings, a packing roller fixed on an intermediate portion of said shaft and having ends spaced from said bearings, resilient means yieldingly urging said roller downwardly and comprising a pair of braces disposed in side-by-side relation and positioned between said arms, each brace comprising separable male and female telescopic sections with a rear end of a male section having a bearing journaled on said shaft in spaced relation to one of said roller ends and its adjacent arm and with a forward end of the female section being pivotally connected to said potato planter at location disposed above the arm connections thereto, a coil spring mounted on each brace and abuttingly engaging said male section bearing, a collar secured to the female section engaging said spring and retaining the latter under compression and yieldingly urging said sections towards an extended position.

References Cited in the file of this patent

UNITED STATES PATENTS

| | | |
|---|---|---|
| 380,549 | Brown | Apr. 3, 1888 |
| 471,863 | Horne | Mar. 29, 1892 |
| 1,329,375 | Collins | Feb. 3, 1920 |
| 1,456,668 | Billings | May 29, 1923 |
| 1,718,823 | Jeppson | June 25, 1929 |
| 2,322,076 | Watson | June 15, 1943 |
| 2,422,409 | Greenroyd | June 17, 1947 |
| 2,685,243 | Cole | Aug. 3, 1954 |